US012399910B2

(12) United States Patent
Sen et al.

(10) Patent No.: US 12,399,910 B2
(45) Date of Patent: Aug. 26, 2025

(54) WORKLOAD INSPIRED INPUT SELECTION OF DATABASES FOR RESHARDING

(71) Applicant: Rubrik, Inc., Palo Alto, CA (US)

(72) Inventors: Rajorshi Sen, Redmond, WA (US); Prabudas Varadarajan, Bangalore (IN); Manjunath Chinni, Saratoga, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/523,730

(22) Filed: Nov. 29, 2023

(65) Prior Publication Data

US 2025/0173358 A1    May 29, 2025

(51) Int. Cl.
*G06F 16/27*  (2019.01)
*G06F 11/34*  (2006.01)
*G06F 16/25*  (2019.01)

(52) U.S. Cl.
CPC ........ *G06F 16/278* (2019.01); *G06F 11/3414* (2013.01); *G06F 16/25* (2019.01)

(58) Field of Classification Search
CPC ..... G06F 16/278; G06F 11/3414; G06F 16/25
See application file for complete search history.

(56) References Cited

U.S. PATENT DOCUMENTS

| 11,615,115 | B2* | 3/2023 | Horowitz | G06F 16/2365 |
| | | | | 707/613 |
| 11,652,892 | B2* | 5/2023 | Unnithan | H04L 67/148 |
| | | | | 709/227 |
| 11,663,178 | B2* | 5/2023 | Nara | G06F 16/217 |
| | | | | 707/692 |
| 2017/0011028 | A1* | 1/2017 | Wang | G06F 9/5088 |
| 2023/0131898 | A1* | 4/2023 | Willett | G06F 3/0482 |
| | | | | 707/803 |
| 2024/0241866 | A1* | 7/2024 | Jin | G06F 11/3457 |

* cited by examiner

*Primary Examiner* — Dangelino N Gortayo
(74) *Attorney, Agent, or Firm* — Holland & Hart LLP

(57) ABSTRACT

Methods, systems, and devices for data management are described. A database server may identify workload metrics for a set of database instances and generate a weighted sum of the workload metrics for each database distance. The database server may select, for a resharding operation, a first set of database instances and a second set of database instances, and the selection may be based on a relationship between a first sum of one or more respective weighted sums for the database instances in the first set and a second sum of one or more respective weighted sums for the database instances in the second set. The database server may execute the resharding operation that results in the first set continuing to be supported by the first database server and the second set being supported by the second database server.

20 Claims, 9 Drawing Sheets

WORKLOAD INSPIRED INPUT SELECTION OF DATABASES FOR RESHARDING

FIELD OF TECHNOLOGY

The present disclosure relates generally to data management, including techniques for workload inspired input selection of databases for resharding.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

A single server may host multiple database instances in a multi-tenant environment. In such environments, a workload of a database instance may increase such that some type of scaling is required. In some cases, vertical scaling (e.g., addition of memory and compute resources) may be used to increase the capacity/workload of the server. However, vertical scaling may result in a significant increase in the time needed to back up or clone a database instance, and some types of databases may be associated with an upper limit for vertical scaling. As such, at some point, vertical scaling may not be feasible or desirable. To further scale such environments, the instances of the server may be allocated to multiple servers via a process referred to as resharding. Resharding requires that some database instances be moved to the new server. In such cases, it is desirable to target an even split of the load on the servers. In some systems, the selection for resharding is based on the size of the databases. However, such a selection may not result in an even split in workload, as some databases may be associated with increased input/output (I/O) operations relative to other database instances, regardless of the size of the database (e.g., a small database may have a relatively high workload, or a large database may have a relatively small workload).

To support efficient distribution of a workload for a database resharding operation, instead of splitting a server/database based on size, techniques described herein propose analyzing other metrics, such as the quantity of reads and writes occurring in a database instance, and selecting instances to target an even split in the workload (e.g., equal split in compute, memory, and I/O consumption) by computing weighted sums of workload metrics for each database instance. The database instances may then be divided into groups so as to have two groups such that the sums of the weighted sums for each group are as nearly equal as possible. To support such techniques, different weights may be applied to various metrics to account for varying impacts of such operations on the database. These and other techniques are described in further detail herein with respect to the figures.

Figure 1:
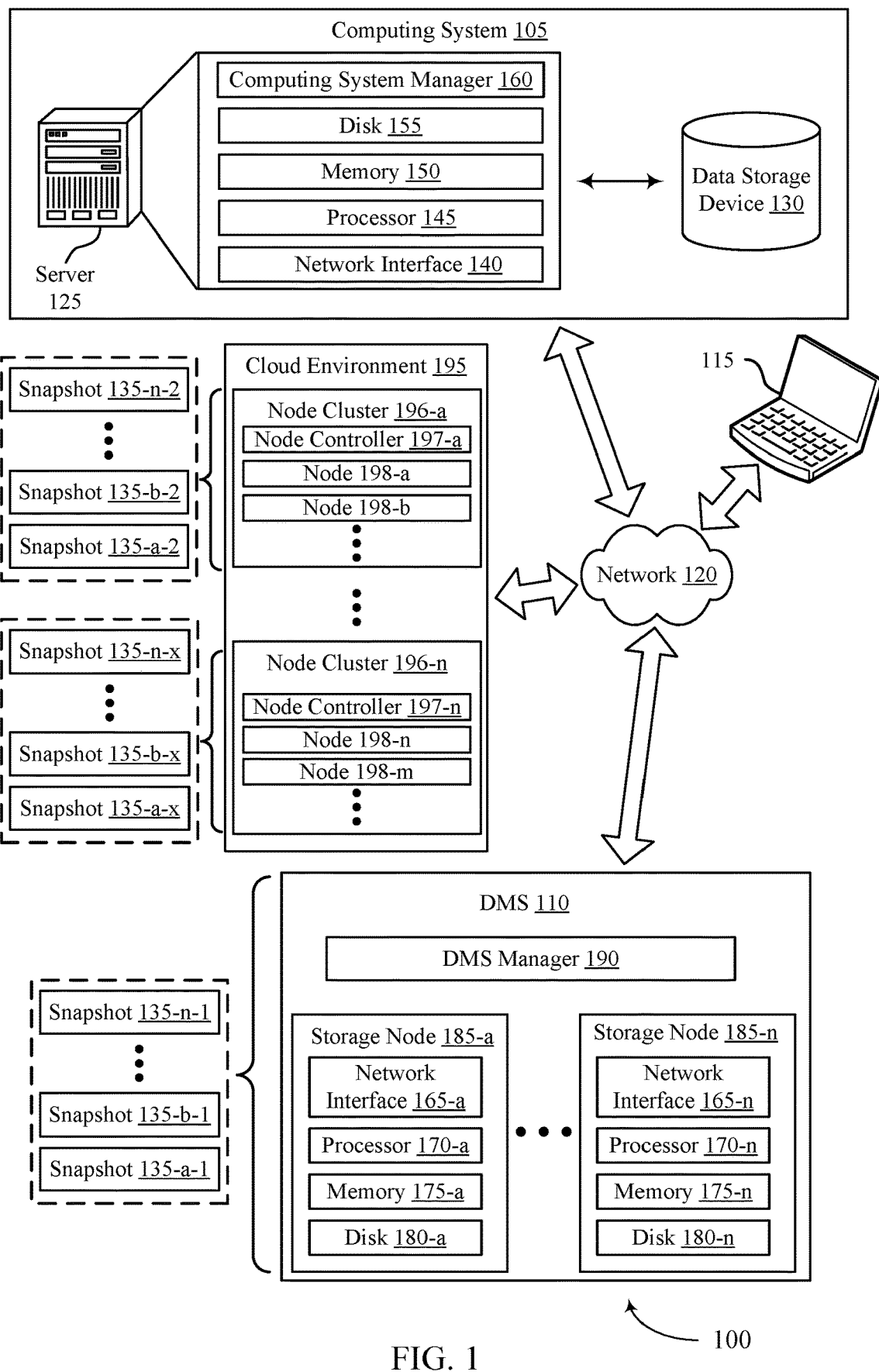
FIG. 1 illustrates an example of a computing environment that supports workload inspired input selection of databases for resharding in accordance with aspects of the present disclosure.

FIG. 1 illustrates an example of a computing environment 100 that supports workload inspired input selection of databases for resharding in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

Various aspects of the computing environment 100 may include or support a database server. That is, the computing system 105, the cloud environment 195, and/or the DMS 110 may support a database server. For example, the cloud environment 195 may implement a database server to support storage of backup data of the computing system 105 and/or the data storage device 130. In some cases, a database server may support storage of backup data for multiple different host computing systems (e.g., the computing system 105), host environments, organizations, or the like. Accordingly, the database server may be a multi-tenant database server that implements a set of database instances. Each database instance may support a different host computing system, client, organization, or the like.

As more data as stored to the database server, the database server may be vertically scaled, such as by adding physical compute resources (e.g., memory and processors). However, there may be upper limits to vertically scaling a database server, and the upper limits may be based on the database software that executes on the database server or based on other factors. To further scale such database servers, the database server may be resharded, which may result in some database instances be moved to the new server. In such cases, it is desirable to target an even split of the load on the servers. In some systems, the selection for resharding is based on the size of the databases. However, such a selection may not result in an even split in workload, as some databases may be associated with increased input/output (I/O) operations relative to other database instances, regardless of the size of the database (e.g., a small database may have a relatively high workload, or a large database may have a relatively small workload).

To support efficient distribution of a workload for a database resharding operation, instead of splitting a server/database based on size, techniques described herein propose analyzing other metrics, such as the quantity of reads and writes occurring in a database instance and selecting instances to target an even split in the workload (e.g., equal split in compute, memory, and I/O consumption). To identify the even split, a weighted sum of workload metrics for each database instance may be computed, then the database instances may be divided into groups so as to have two groups such that the sums of the weighted sums for each group are as nearly equal as possible. To support such techniques, different weights may be applied to various metrics to account for varying impacts of such operations on the database. Selecting database instances for a resharding operation in this matter may result in an even split in workload, thereby resulting in more efficient utilization of computing resources.

Figure 2:
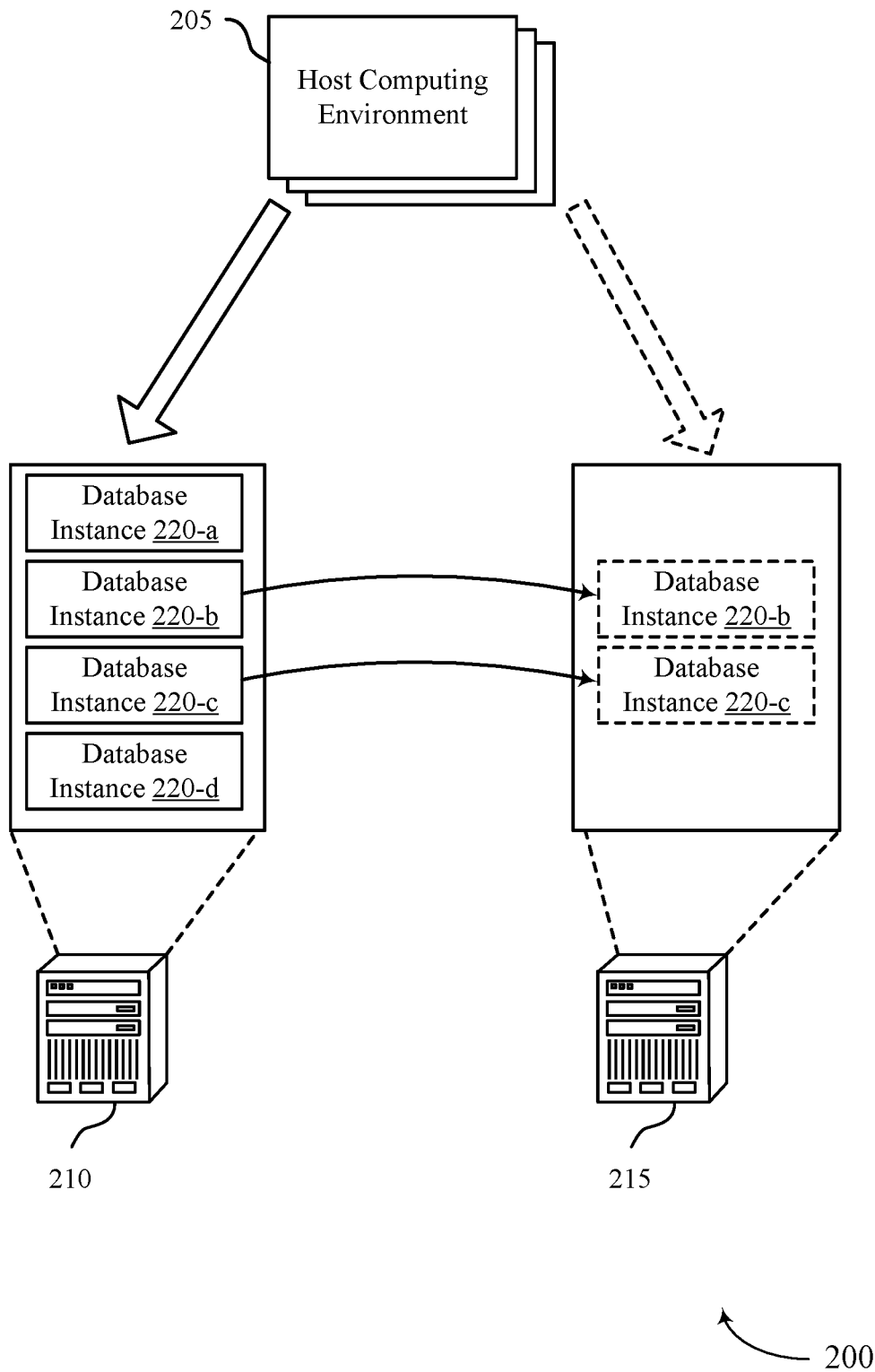
FIG. 2 shows an example of a computing environment that supports workload inspired input selection of databases for resharding in accordance with aspects of the present disclosure.

FIG. 2 shows an example of a computing environment 200 that supports workload inspired input selection of databases for resharding in accordance with aspects of the present disclosure. The computing environment 200 includes a host computing environment 205, a database server 210, and a database server 215. The computing environment 200 may implement aspects of computing environment 100 of FIG. 1. For example, the host computing environment 205 may be an example of aspects of the computing system 105, and the database servers 210 and 215 may examples of aspects of the cloud environment 195 and/or the DMS 110. Aspects of the disclosure described herein are described with respect to the database servers 210 and 215 supporting the backup of data of one or more of the host computing environments 205, but it should be understood that the techniques described herein may be applicable to database servers functioning in other environments, such as a database server functioning in a production environment.

The database server 210 may function in a multi-tenant environment, in that the database server 210 may support multiple database instances 220. In the example of FIG. 2, each database instance of the database server 210 may store backup data of a respective host computing environment 205. However, it should be understood that a database instance 220 may support backup operations for multiple host computing environments 205 or that multiple database instances 220 may support backup operations for a single host computing environment 205. As the amount of data and/or workloads supported by the database server 210 increases, vertical scaling, or the addition of memory and processor resources, may be used to support the increased amount of data and/or workloads. However, at some point, vertical scaling may not be feasible due to cost, resource, and/or software limitations of the database server 210. In such cases, the server may be logically "split" into two servers via a process referred to as resharding. In such cases, a subset of the database instances of the database server 210 may be moved to a new database server, such as the database server 215.

In some cases, the selection of database instances 220 for moving to a new database server for resharding is based on the size of the database instances. However, this approach may not result in an even load split since the size is not always a direct indicator of the resources consumed on the database instance 220. For example, some database instances may be associated with increased input/output (I/O) operations relative to other database instances, regardless of the size of the database (e.g., a small database may have a relatively high workload, or a large database may have a relatively small workload).

As described herein, the database instance selection for movement for resharding is based on a set of metrics associated with the operations of the database instances. Example metrics that may be considered for selection for resharding include read frequency (e.g., quantity of reads), write frequency (e.g., quantity of writes), connections (e.g., the quantity of sessions between a client and the database server). Accordingly, when a resharding operation is triggered for the database server 210, a weighted sum of metrics for each database instance may be computed and used for selection among the database instances of the database server 210 to move to the database server 215.

A resharding operation may be triggered based on various conditions. In some examples, a resharding operation is triggered based on determining that a vertical scaling limit is satisfied, that a processor usage metrics is over a processor usage threshold, or both. For example, if the vertical scaling limit is satisfied (e.g., addition of memory and processor resources for the database server 210 is not feasible or is restricted based on a software or hardware limit) and/or the sustained processor usage is over a threshold for some period (e.g., over 50% for a week or averages over 50% for a week), then the resharding operation may be triggered. It should be understood that other metrics may be considered in triggering a resharding operation. In some examples, a resharding operation is manually triggered (e.g., based on input by a user).

The resharding operations are described with respect to the database server 210 performing the operations, but it should be understood that the example operations may be performed by an associated application or service (e.g., a resharding service). The database server 210 (e.g., or the associated application or service) may identify respective workload metrics (e.g., quantity of reads, quantity of writes, quantity of connections), for each (or a least a subset of) database instance 220 of the database server 210 that is to be resharded. The workload metrics may be precomputed or monitored for a time period prior to the resharding operation. For example, the workload metrics may be identified for a predefined, configured, or selected time period or window prior to the resharding operation. A time window may be used instead of using all-time metrics because the all-time metrics may not be indicative of the current workload of a database instance 220. The database server 210 may generate (e.g., calculate or compute) weighted sums of the workload metrics for each database instance 220. For example, a first weighting factor may be applied to the quantity of writes metric, a second weighting factor may be applied to the quantity of connections metric, and a third weighting factor may be applied to a quantity of reads metric. An example weighted sum calculation is as follows:

$$\text{weighted sum} = \text{total\_queries} * 0.35 +$$
$$\text{rows\_examined} * 0.35 + \text{rows\_sorted} * 0.2 + \text{rows\_impacted} * 0.1,$$
$$\text{where rows\_examined and rows\_sorted indicate read}$$
$$I/O(\text{e.g., quantity of reads}) \text{ and rows\_impacted}$$
$$\text{indicates write } I/O(\text{e.g., quantity of writes}).$$

The weights assigned to a metrics may be dependent on the operation environment of the database server 210. For example, database servers supporting backup operations, such as the database server 210 of FIG. 2, may be read heavy, and as such, the weighting factor applied to the read metrics may be relatively high. In such cases, a first weighting factor applied to a quantity of writes may be higher than a second weighting factor applied to a quantity of connections, which may be higher than a third weighting factor applied to a quantity of reads metric. As another example, database servers that support a production environment may be write heavy, and the weighting factor applied to the write metrics may be relatively high.

After the weighted sums are computed for the database instances 220 of the database server 210, the database server 210 may select the database instances that are to be moved to the new or other database server 215. To select the database instances to move, the database server 210 may sort the database instances 220 into two sets or groups such that the total weighted sums of database instances in a group are relatively equal. For example, the database server 210 may try different sets and generate the total weighted sums and select the groups such that the difference between the total weighted sums in each group is minimized (e.g., the group configuration with the smallest difference between the two total weighted sums is selected). After the groups are selected, the database server 210 may execute the resharding operation that results in the database instances of one group being moved to the new or other database server 215. As illustrated in FIG. 2, the database instances 220-*b* and 220-*c* are moved to the database server 215. Thereafter, the database instances 220-*b* and 220-*c* may support backup operations for one or more of the host computing environments 205.

Figure 3:
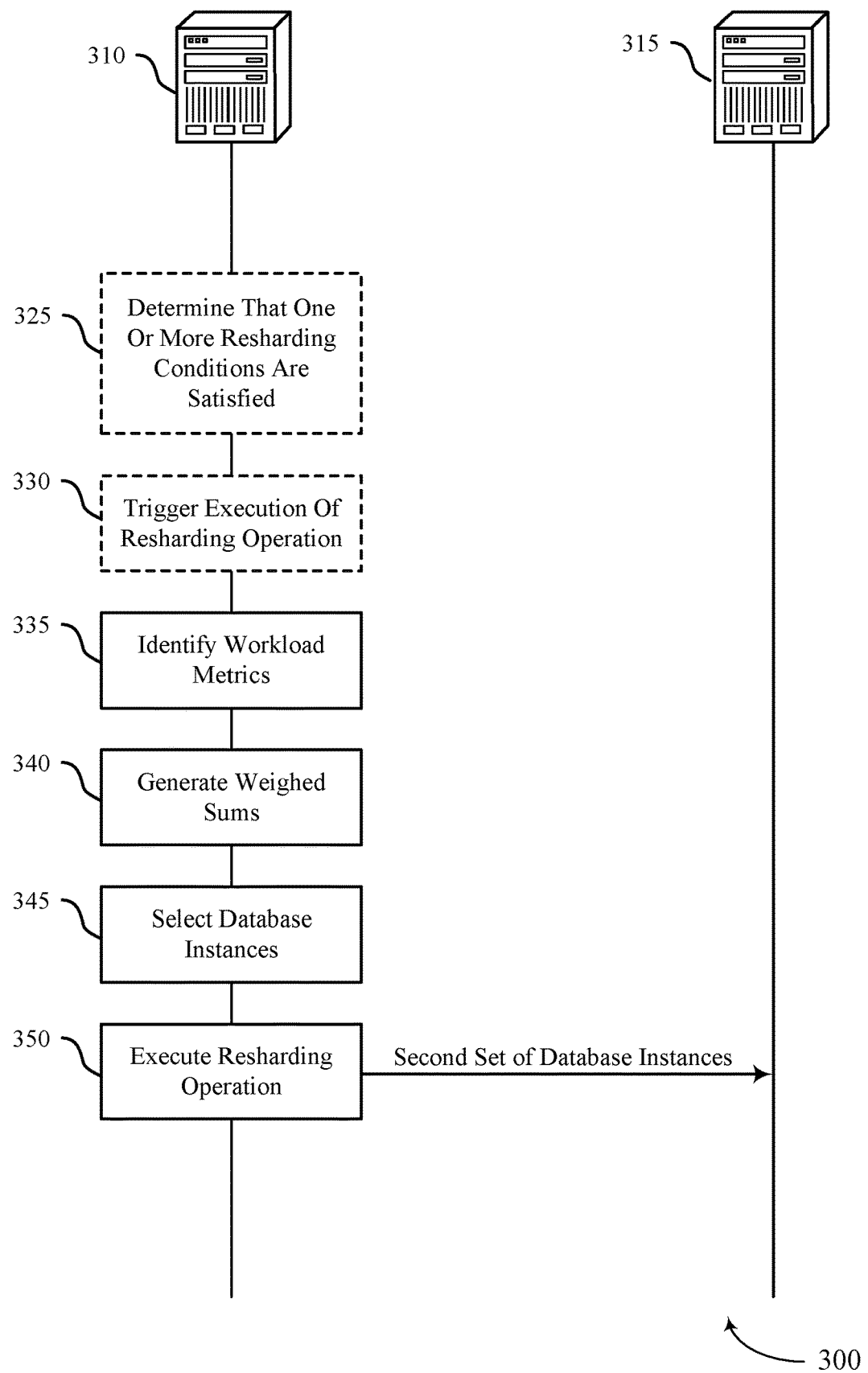
FIG. 3 shows an example of a process flow that supports workload inspired input selection of databases for resharding in accordance with aspects of the present disclosure.

FIG. 3 shows an example of a process flow 300 that supports workload inspired input selection of databases for resharding in accordance with aspects of the present disclosure. The process flow 300 includes a first database server 310 and a first database server 315, which may be examples of the corresponding devices of FIG. 2. For example, the first database server 310 may be an example of the database server 210 of FIG. 2, and the database server 315 may be an example of the database server 215 of FIG. 2. Aspects of FIG. 3 are described with respect to the database server 310 performing aspects of the process flow 300, but it should be understood that the operations of process flow 300 may be performed by an associated device, system, or service. In the following description of the process flow 300, operations may be added, omitted, or performed in a different order (with respect to the exemplary order shown).

At 325, the first database server 310 may determine that one or more conditions for triggering a resharding operation are satisfied for the first database server 310. An example of a triggering condition being satisfied may include a vertical scaling limit for the first database server 210 being satisfied, and the vertical scaling limit may be based on a quantity of resources associated with the first database server. For example, the software and/or hardware of the first database server 310 may have an upper limit (e.g., software and/or hardware limit) on a quantity or capacity of processors and/or memory devices that may be implemented in the first database server 310. Another example of a triggering condition being satisfied may include a processor usage metric for the first database server 310 being over a processor usage threshold during a time window prior to the resharding operation. For example, the first database server 310 may determine that the CPU usage of the first database server 310 is over a 50% (e.g., continuously or on an averaged basis) for a duration. It is to be understood that these are merely examples, and other triggering conditions may be evaluated in accordance with the techniques described herein.

At 330, the first database server 310 may trigger execution of the resharding operation based on satisfaction of the one or more triggering conditions. For example, the resharding operation may be triggered based at least in part on the vertical scaling limit being satisfied, based at least in part on the processor usage metric being over the processor usage threshold, or both. Other metrics may be considered as a condition for triggering a resharding operation. In some cases, a resharding operation is triggered based on user input. Resharding may be triggered based on any one condition being satisfied or based on any combination of conditions being satisfied.

At 335, the first database server 310 may identify a respective plurality of workload metrics for each database instance of a plurality of database instances supported by a first database server 310. The workload metrics may be identified in response to triggering execution of the resharding operation. In some cases, the respective plurality of workload metrics is identified in accordance with operations of the plurality of database instances during a time window (e.g., 2 weeks) prior to execution of the resharding operation.

At 340, the first database server 310 may generate for each database instance, a respective weighted sum of the respective plurality of workload metrics. In some cases, generating the respective weighted sum may include applying a first weighting factor to a quantity of writes metric that is included in the respective plurality of workload metrics for the database instance, applying a second weighting factor to a quantity of connections metric that is included in the respective plurality of workload metrics for the database instance, and applying a third weighting factor to a quantity of reads metric that is included in the respective plurality of workload metrics for the database instance. In some examples, the first weighting factor is greater than the second weighting factor, and the second weighting factor is greater than the third weighting factor. In some examples, the first database server 310 may select a respective weighting factor for each of the respective plurality of workload metrics based on the first database server supporting data backup operations for one or more host computing environments.

At 345, the first database server 310 may select, for the resharding operation and from among the plurality of database instances, a first set of one or more database instances to continue being supported by the first database server and a second set of one or more database instances to be supported by the second database server 315 that is different from the first database server. The selection of the first set of one or more database instances and the second set of one or more database instances may be based on a relationship between a first sum of one or more respective weighted sums for the one or more database instances in the first set of one or more database instances and a second sum of one or more respective weighted sums for the one or more database instances in the second set of one or more database instances. The first database server 310 may select the first set of one or more database instances and the second set of one or more database instances such that a difference between the first sum and the second sum is minimized.

At 350, the first database server 310 may execute the resharding operation that results in the first set of one or more database instances continuing to be supported by the first database server and the second set of one or more database instances being supported by the second database server 315.

Figure 4:
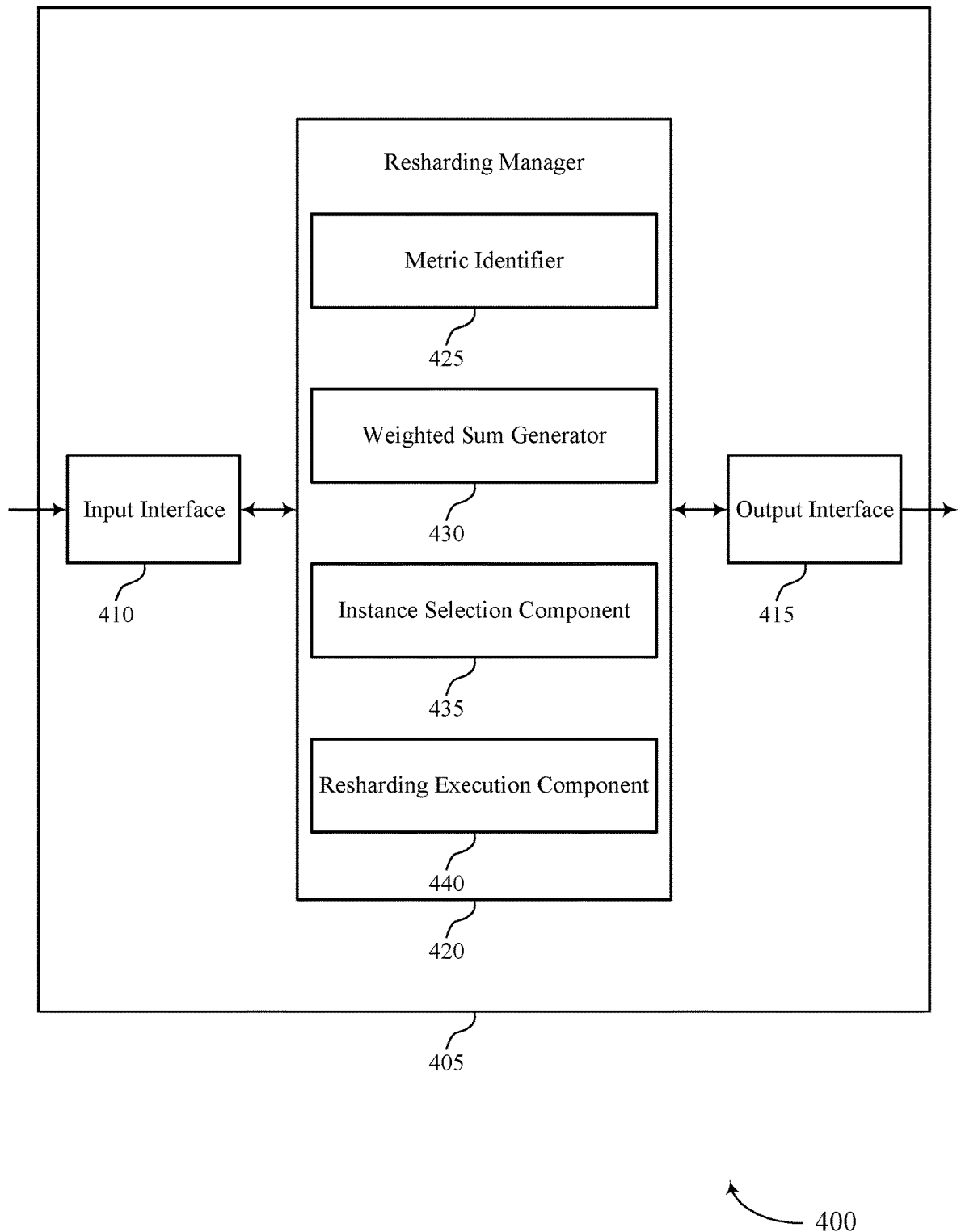
FIG. 4 shows a block diagram of an apparatus that supports workload inspired input selection of databases for resharding in accordance with aspects of the present disclosure.

FIG. 4 shows a block diagram 400 of a system 405 that supports workload inspired input selection of databases for resharding in accordance with aspects of the present disclosure. In some examples, the system 405 may be an example of aspects of one or more components described with reference to FIG. 1, such as a DMS 110. The system 405 may include an input interface 410, an output interface 415, and a resharding manager 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the resharding manager 420 to support workload inspired input selection of databases for resharding. In some cases, the input interface 410 may be a component of a network interface 625 as described with reference to FIG. 6.

The output interface 415 may manage output signaling for the system 405. For example, the output interface 415 may receive signaling from other components of the system 405, such as the resharding manager 420, and may transmit such output signaling corresponding to (e.g., representative of or otherwise based on) such signaling to other systems or devices. In some cases, the output interface 415 may be a component of a network interface 625 as described with reference to FIG. 6.

For example, the resharding manager 420 may include a metric identifier 425, a weighted sum generator 430, an instance selection component 435, a resharding execution component 440, or any combination thereof. In some examples, the resharding manager 420, or various components thereof, may be configured to perform various operations (e.g., receiving, monitoring, transmitting) using or otherwise in cooperation with the input interface 410, the output interface 415, or both. For example, the resharding manager 420 may receive information from the input interface 410, send information to the output interface 415, or be integrated in combination with the input interface 410, the output interface 415, or both to receive information, transmit information, or perform various other operations as described herein.

The metric identifier 425 may be configured as or otherwise support a means for identifying a respective set of multiple workload metrics for each database instance of a set of multiple database instances supported by a first database server. The weighted sum generator 430 may be configured as or otherwise support a means for generating, for each database instance, a respective weighted sum of the respective set of multiple workload metrics. The instance selection component 435 may be configured as or otherwise support a means for selecting, for a resharding operation and from among the set of multiple database instances, a first set of one or more database instances to continue being supported by the first database server and a second set of one or more database instances to be supported by a second database server that is different from the first database server, where selection of the first set of one or more database instances and the second set of one or more database instances is based on a relationship between a first sum of one or more respective weighted sums for the one or more database instances in the first set of one or more database instances and a second sum of one or more respective weighted sums for the one or more database instances in the second set of one or more database instances. The resharding execution component 440 may be configured as or otherwise support a means for executing the resharding operation that results in the first set of one or more database instances continuing to be supported by the first database server and the second set of one or more database instances being supported by the second database server.

Figure 5:
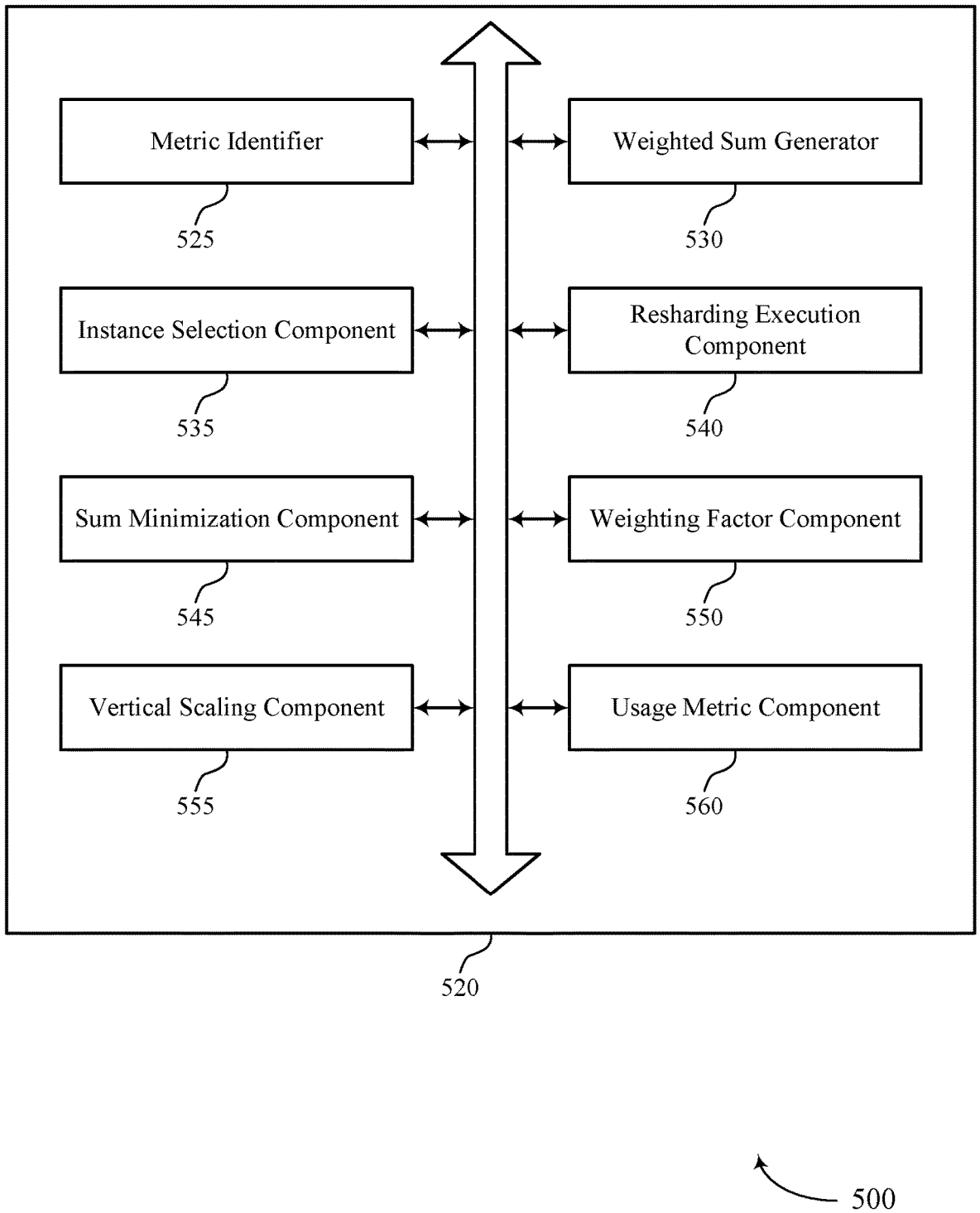
FIG. 5 shows a block diagram of a resharding manager that supports workload inspired input selection of databases for resharding in accordance with aspects of the present disclosure.

FIG. 5 shows a block diagram 500 of a resharding manager 520 that supports workload inspired input selection of databases for resharding in accordance with aspects of the present disclosure. The resharding manager 520 may be an example of aspects of a resharding manager or a resharding manager 420, or both, as described herein. The resharding manager 520, or various components thereof, may be an example of means for performing various aspects of workload inspired input selection of databases for resharding as described herein. For example, the resharding manager 520 may include a metric identifier 525, a weighted sum generator 530, an instance selection component 535, a resharding execution component 540, a sum minimization component 545, a weighting factor component 550, a vertical scaling component 555, a usage metric component 560, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The metric identifier 525 may be configured as or otherwise support a means for identifying a respective set of multiple workload metrics for each database instance of a set of multiple database instances supported by a first database server. The weighted sum generator 530 may be configured as or otherwise support a means for generating, for each database instance, a respective weighted sum of the respective set of multiple workload metrics. The instance selection component 535 may be configured as or otherwise support a means for selecting, for a resharding operation and from among the set of multiple database instances, a first set of one or more database instances to continue being supported by the first database server and a second set of one or more database instances to be supported by a second database server that is different from the first database server, where selection of the first set of one or more database instances and the second set of one or more database instances is based on a relationship between a first sum of one or more respective weighted sums for the one or more database instances in the first set of one or more database instances and a second sum of one or more respective weighted sums for the one or more database instances in the second set of one or more database instances. The resharding execution component 540 may be configured as or otherwise support a means for executing the resharding operation that results in the first set of one or more database instances continuing to be supported by the first database server and the second set of one or more database instances being supported by the second database server.

In some examples, to support selecting the first set of one or more database instances and the second set of one or more database instances, the sum minimization component 545 may be configured as or otherwise support a means for selecting the first set of one or more database instances and the second set of one or more database instances such that a difference between the first sum and the second sum is minimized.

In some examples, to support generating the respective weighted sum includes for a database instance, the weighting factor component 550 may be configured as or otherwise support a means for applying a first weighting factor to a quantity of writes metric that is included in the respective set of multiple workload metrics for the database instance. In some examples, to support generating the respective weighted sum includes for a database instance, the weighting factor component 550 may be configured as or otherwise support a means for applying a second weighting factor to a quantity of connections metric that is included in the respective set of multiple workload metrics for the database instance. In some examples, to support generating the respective weighted sum includes for a database instance, the weighting factor component 550 may be configured as or otherwise support a means for applying a third weighting factor to a quantity of reads metric that is included in the respective set of multiple workload metrics for the database instance.

In some examples, the first weighting factor is greater than the second weighting factor. In some examples, the second weighting factor is greater than the third weighting factor.

In some examples, to support identifying the respective set of multiple workload metrics for each database instance, the metric identifier 525 may be configured as or otherwise support a means for identifying the respective set of multiple workload metrics in accordance with operations of the set of multiple database instances during a time window prior to execution of the resharding operation.

In some examples, the vertical scaling component 555 may be configured as or otherwise support a means for determining that a vertical scaling limit is satisfied for the first database server, where the vertical scaling limit is based on a quantity of resources associated with the first database server. In some examples, the resharding execution component 540 may be configured as or otherwise support a means for triggering execution of the resharding operation based on the vertical scaling limit being satisfied.

In some examples, the usage metric component 560 may be configured as or otherwise support a means for determining that processor usage metric for the first database server is over a processor usage threshold during a time window prior to the resharding operation. In some examples, the resharding execution component 540 may be configured as or otherwise support a means for triggering execution of the resharding operation based on the processor usage metric being over the processor usage threshold.

In some examples, the weighting factor component 550 may be configured as or otherwise support a means for selecting a respective weighting factor for each of the respective set of multiple workload metrics based on the first database server supporting data backup operations for one or more host computing environments.

Figure 6:
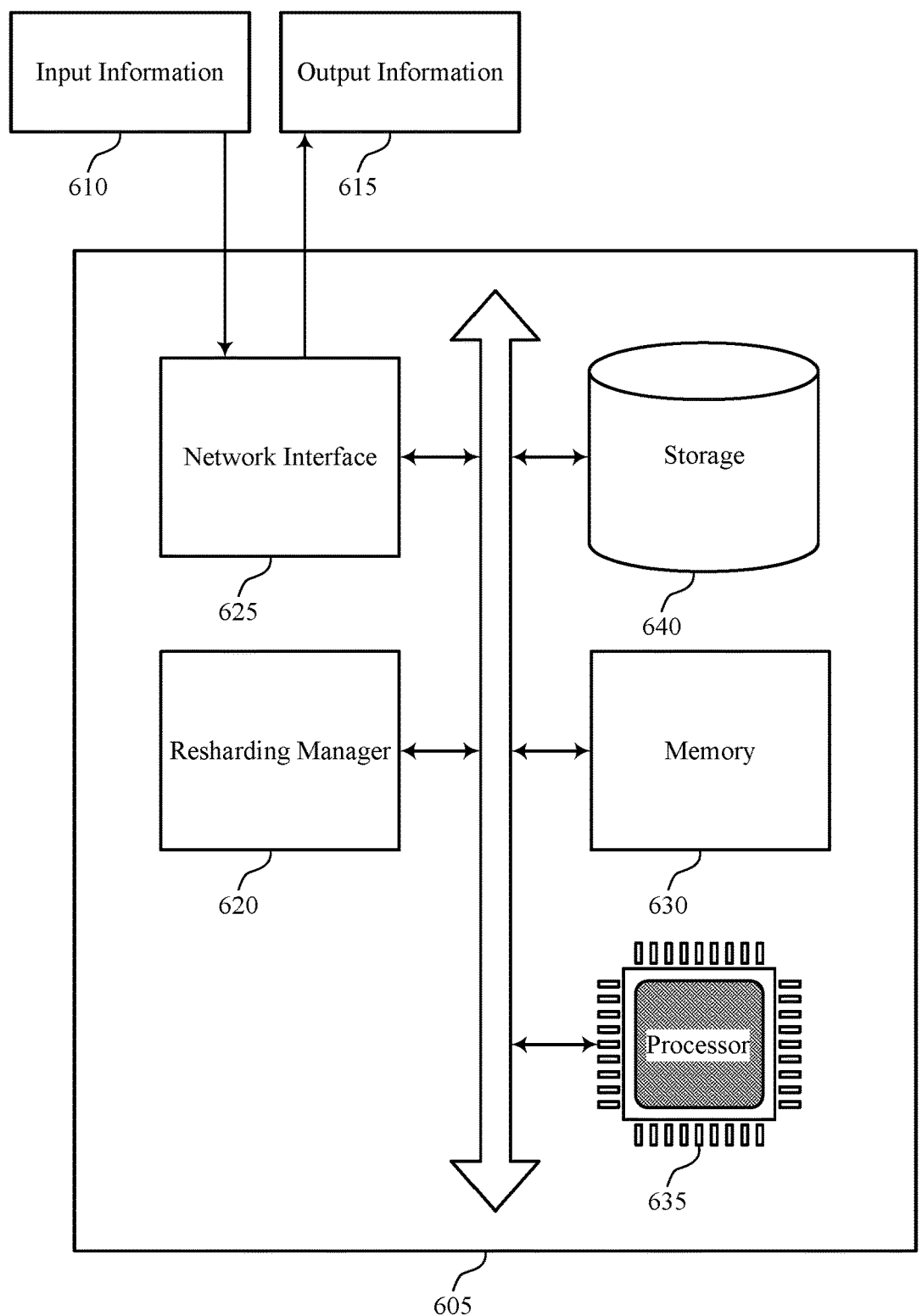
FIG. 6 shows a diagram of a system including a device that supports workload inspired input selection of databases for resharding in accordance with aspects of the present disclosure.

FIG. 6 shows a block diagram 600 of a system 605 that supports workload inspired input selection of databases for resharding in accordance with aspects of the present disclosure. The system 605 may be an example of or include the components of a system 405 as described herein. The system 605 may include components for data management, including components such as a resharding manager 620, an input information 610, an output information 615, a network interface 625, at least one memory 630, at least one processor 635, and a storage 640. These components may be in electronic communication or otherwise coupled with each other (e.g., operatively, communicatively, functionally, electronically, electrically; via one or more buses, communications links, communications interfaces, or any combination thereof). Additionally, the components of the system 605 may include corresponding physical components or may be implemented as corresponding virtual components (e.g., components of one or more virtual machines). In some examples, the system 605 may be an example of aspects of one or more components described with reference to FIG. 1, such as a DMS 110.

The network interface 625 may enable the system 605 to exchange information (e.g., input information 610, output information 615, or both) with other systems or devices (not shown). For example, the network interface 625 may enable the system 605 to connect to a network (e.g., a network 120 as described herein). The network interface 625 may include one or more wireless network interfaces, one or more wired network interfaces, or any combination thereof. In some examples, the network interface 625 may be an example of may be an example of aspects of one or more components described with reference to FIG. 1, such as one or more network interfaces 165.

Memory 630 may include RAM, ROM, or both. The memory 630 may store computer-readable, computer-executable software including instructions that, when executed, cause the processor 635 to perform various functions described herein. In some cases, the memory 630 may contain, among other things, a basic input/output system (BIOS), which may control basic hardware or software operation such as the interaction with peripheral components or devices. In some cases, the memory 630 may be an example of aspects of one or more components described with reference to FIG. 1, such as one or more memories 175.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., functions or tasks supporting workload inspired input selection of databases for resharding). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. In some cases, the processor 635 may be an example of aspects of one or more components described with reference to FIG. 1, such as one or more processors 170.

Storage 640 may be configured to store data that is generated, processed, stored, or otherwise used by the system 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1, such as one or more network disks 180.

For example, the resharding manager 620 may be configured as or otherwise support a means for identifying a respective set of multiple workload metrics for each database instance of a set of multiple database instances supported by a first database server. The resharding manager 620 may be configured as or otherwise support a means for generating, for each database instance, a respective weighted sum of the respective set of multiple workload metrics. The resharding manager 620 may be configured as or otherwise support a means for selecting, for a resharding operation and from among the set of multiple database instances, a first set of one or more database instances to continue being supported by the first database server and a second set of one or more database instances to be supported by a second database server that is different from the first database server, where selection of the first set of one or more database instances and the second set of one or more database instances is based on a relationship between a first sum of one or more respective weighted sums for the one or more database instances in the first set of one or more database instances and a second sum of one or more respective weighted sums for the one or more database instances in the second set of one or more database instances. The resharding manager 620 may be configured as or otherwise support a means for executing the resharding operation that results in the first set of one or more database instances continuing to be supported by the first database server and the second set of one or more database instances being supported by the second database server.

By including or configuring the resharding manager 620 in accordance with examples as described herein, the system 605 may support techniques for workload inspired input selection of databases for resharding, which may provide one or more benefits such as, for example, more efficient utilization of computing resources. For example, by balancing resharding operation between two different servers, one of the servers may not be overloaded relative to the other server, thereby improving computing efficiency, utilization of computing resources, and latency, among other possibilities.

Figure 7:
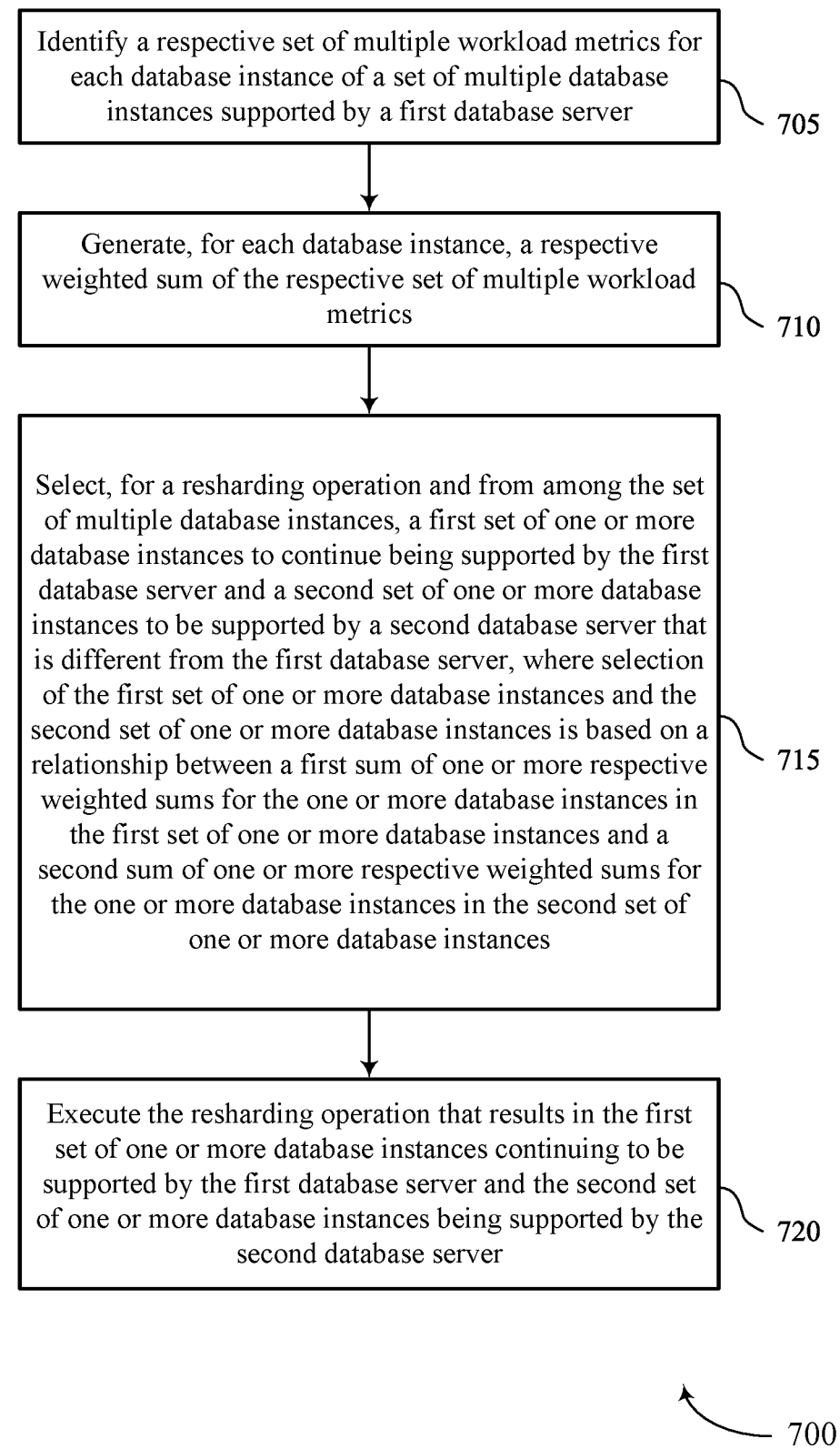
FIGS. 7 through 9 show flowcharts illustrating methods that support workload inspired input selection of databases for resharding in accordance with aspects of the present disclosure.

FIG. 7 shows a flowchart illustrating a method 700 that supports workload inspired input selection of databases for resharding in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include identifying a respective set of multiple workload metrics for each database instance of a set of multiple database instances supported by a first database server. The operations of block 705 may be performed in accordance with examples as disclosed herein. In some examples, aspects of the operations of 705 may be performed by a metric identifier 525 as described with reference to FIG. 5.

At 710, the method may include generating, for each database instance, a respective weighted sum of the respective set of multiple workload metrics. The operations of block 710 may be performed in accordance with examples as disclosed herein. In some examples, aspects of the operations of 710 may be performed by a weighted sum generator 530 as described with reference to FIG. 5.

At 715, the method may include selecting, for a resharding operation and from among the set of multiple database instances, a first set of one or more database instances to continue being supported by the first database server and a second set of one or more database instances to be supported by a second database server that is different from the first database server, where selection of the first set of one or more database instances and the second set of one or more database instances is based on a relationship between a first sum of one or more respective weighted sums for the one or more database instances in the first set of one or more database instances and a second sum of one or more respective weighted sums for the one or more database instances in the second set of one or more database instances. The operations of block 715 may be performed in accordance with examples as disclosed herein. In some examples, aspects of the operations of 715 may be performed by an instance selection component 535 as described with reference to FIG. 5.

At 720, the method may include executing the resharding operation that results in the first set of one or more database instances continuing to be supported by the first database server and the second set of one or more database instances being supported by the second database server. The operations of block 720 may be performed in accordance with examples as disclosed herein. In some examples, aspects of the operations of 720 may be performed by a resharding execution component 540 as described with reference to FIG. 5.

Figure 8:
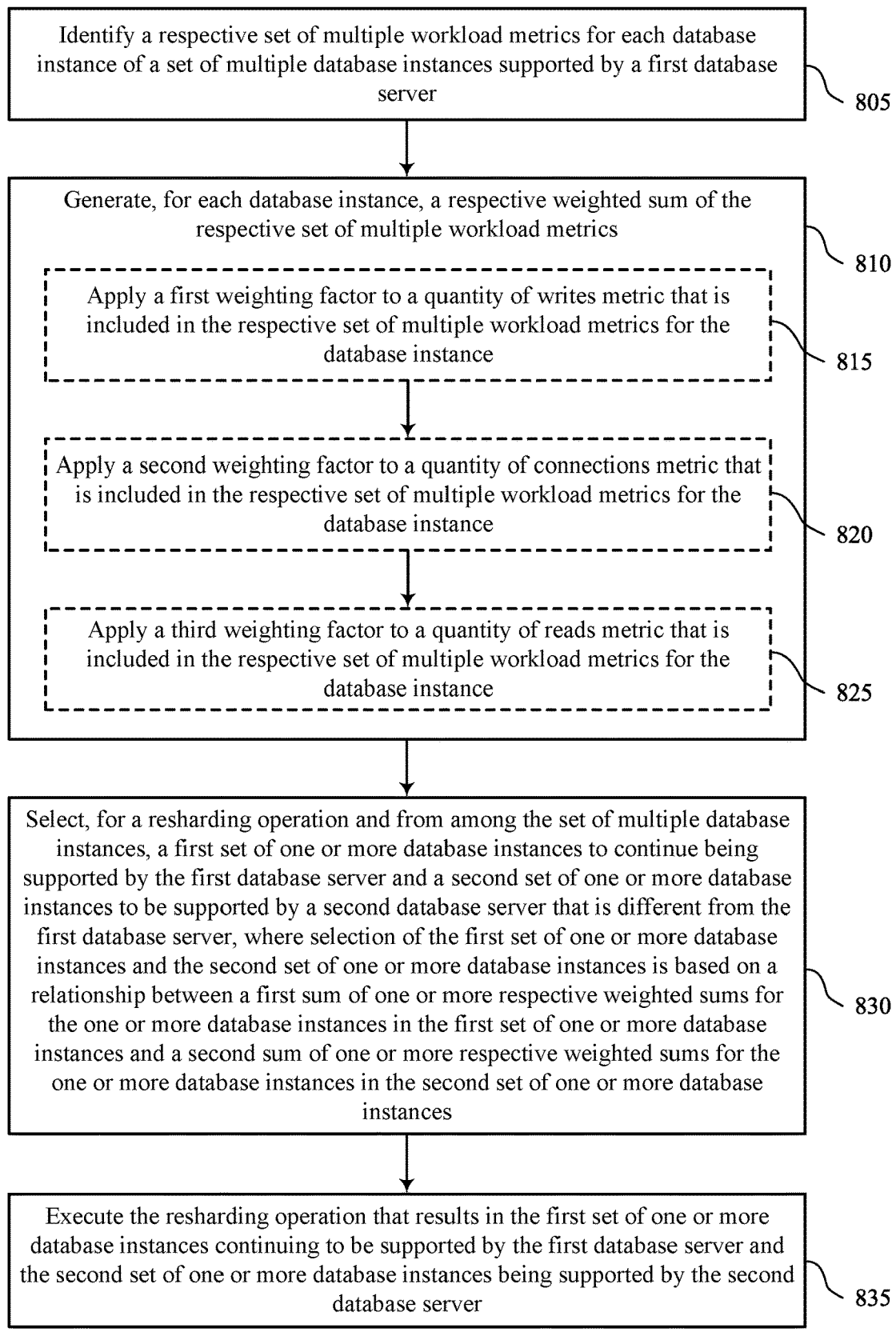

FIG. 8 shows a flowchart illustrating a method 800 that supports workload inspired input selection of databases for resharding in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include identifying a respective set of multiple workload metrics for each database instance of a set of multiple database instances supported by a first database server. The operations of block 805 may be performed in accordance with examples as disclosed herein. In some examples, aspects of the operations of 805 may be performed by a metric identifier 525 as described with reference to FIG. 5.

At 810, the method may include generating, for each database instance, a respective weighted sum of the respective set of multiple workload metrics. The operations of block 810 may be performed in accordance with examples as disclosed herein. In some examples, aspects of the operations of 825 may be performed by a weighted sum generator 530 as described with reference to FIG. 5.

At 815 (e.g., as part generating the respective weighted sum for a database instance), the method may include applying a first weighting factor to a quantity of writes metric that is included in the respective set of multiple workload metrics for the database instance. The operations of block 815 may be performed in accordance with examples as disclosed herein. In some examples, aspects of the operations of 815 may be performed by a weighting factor component 550 as described with reference to FIG. 5.

At 820 (e.g., as part generating the respective weighted sum for a database instance), the method may include applying a second weighting factor to a quantity of connections metric that is included in the respective set of multiple workload metrics for the database instance. The operations of block 820 may be performed in accordance with examples as disclosed herein. In some examples, aspects of the operations of 820 may be performed by a weighting factor component 550 as described with reference to FIG. 5.

At 825 (e.g., as part generating the respective weighted sum for a database instance), the method may include applying a third weighting factor to a quantity of reads metric that is included in the respective set of multiple workload metrics for the database instance. The operations of block 825 may be performed in accordance with examples as disclosed herein. In some examples, aspects of the operations of 825 may be performed by a weighting factor component 550 as described with reference to FIG. 5. The method may further include repeating the operations associated with 815, 820, and 825 for each of the database instances, to generate respective weighted sums for each of the database instances.

At 830, the method may include selecting, for a resharding operation and from among the set of multiple database instances, a first set of one or more database instances to continue being supported by the first database server and a second set of one or more database instances to be supported by a second database server that is different from the first database server, where selection of the first set of one or more database instances and the second set of one or more database instances is based on a relationship between a first sum of one or more respective weighted sums for the one or more database instances in the first set of one or more database instances and a second sum of one or more respective weighted sums for the one or more database instances in the second set of one or more database instances. The operations of block 830 may be performed in accordance with examples as disclosed herein. In some examples, aspects of the operations of 830 may be performed by an instance selection component 535 as described with reference to FIG. 5.

At 835, the method may include executing the resharding operation that results in the first set of one or more database instances continuing to be supported by the first database server and the second set of one or more database instances being supported by the second database server. The operations of block 835 may be performed in accordance with examples as disclosed herein. In some examples, aspects of the operations of 835 may be performed by a resharding execution component 540 as described with reference to FIG. 5.

Figure 9:
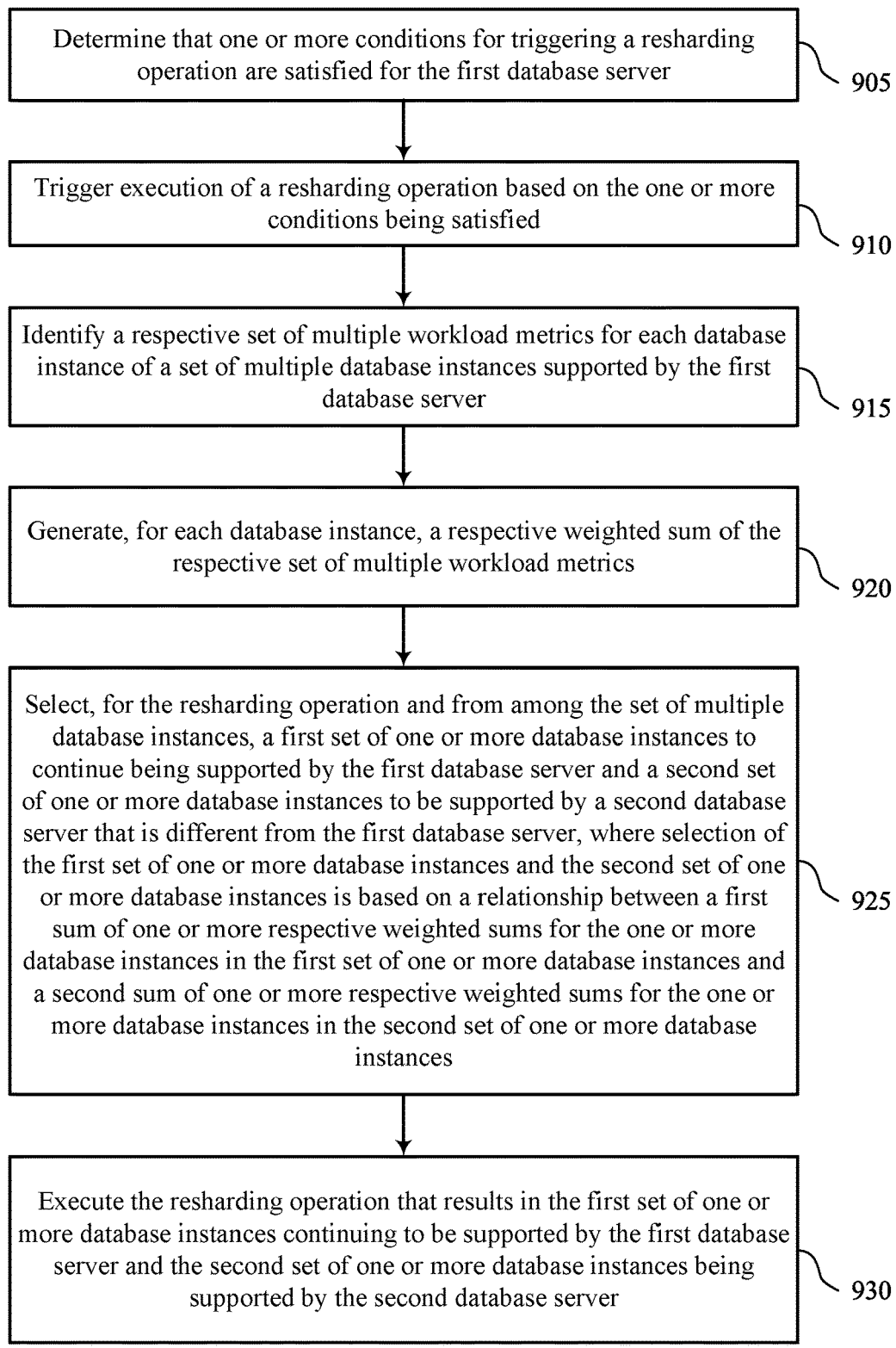

FIG. 9 shows a flowchart illustrating a method 900 that supports workload inspired input selection of databases for resharding in accordance with aspects of the present disclosure. The operations of the method 900 may be implemented by a DMS or its components as described herein. For example, the operations of the method 900 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 905, the method may include determining that one or more conditions for triggering a resharding operation are satisfied for the first database server. Examples of triggering conditions may include a vertical scaling limit for the first database server (e.g., where the vertical scaling limit is based on a quantity of resources associated with the first database server), a processor usage metric for the first database server satisfying a processor usage threshold during a time window (e.g., a time window prior to the determining at 905), or a resharding command or other triggering input being received, among other possible examples. Resharding may be triggered based on any one condition being satisfied or based on any combination of conditions being satisfied. The operations of block 905 may be performed in accordance with examples as disclosed herein. In some examples, aspects of the operations of 905 may be performed by a vertical scaling component 555 as described with reference to FIG. 5.

At 910, the method may include triggering execution of a resharding operation based on the one or more conditions being satisfied. The operations of block 910 may be performed in accordance with examples as disclosed herein. In some examples, aspects of the operations of 910 may be performed by a resharding execution component 540 as described with reference to FIG. 5.

At 915, the method may include identifying a respective set of multiple workload metrics for each database instance of a set of multiple database instances supported by a first database server. The operations of block 915 may be performed in accordance with examples as disclosed herein. In some examples, aspects of the operations of 915 may be performed by a metric identifier 525 as described with reference to FIG. 5.

At 920, the method may include generating, for each database instance, a respective weighted sum of the respective set of multiple workload metrics. The operations of block 920 may be performed in accordance with examples as disclosed herein. In some examples, aspects of the operations of 920 may be performed by a weighted sum generator 530 as described with reference to FIG. 5.

At 925, the method may include selecting, for a resharding operation and from among the set of multiple database instances, a first set of one or more database instances to continue being supported by the first database server and a second set of one or more database instances to be supported by a second database server that is different from the first database server, where selection of the first set of one or more database instances and the second set of one or more database instances is based on a relationship between a first sum of one or more respective weighted sums for the one or more database instances in the first set of one or more database instances and a second sum of one or more respective weighted sums for the one or more database instances in the second set of one or more database instances. The operations of block 925 may be performed in accordance with examples as disclosed herein. In some examples, aspects of the operations of 925 may be performed by an instance selection component 535 as described with reference to FIG. 5.

At 930, the method may include executing the resharding operation that results in the first set of one or more database instances continuing to be supported by the first database server and the second set of one or more database instances being supported by the second database server. The operations of block 930 may be performed in accordance with examples as disclosed herein. In some examples, aspects of the operations of 930 may be performed by a resharding execution component 540 as described with reference to FIG. 5.

A method by an apparatus is described. The method may include identifying a respective set of multiple workload metrics for each database instance of a set of multiple database instances supported by a first database server, generating, for each database instance, a respective weighted sum of the respective set of multiple workload metrics, selecting, for a resharding operation and from among the set of multiple database instances, a first set of one or more database instances to continue being supported by the first database server and a second set of one or more database instances to be supported by a second database server that is different from the first database server, where selection of the first set of one or more database instances and the second set of one or more database instances is based on a relationship between a first sum of one or more respective weighted sums for the one or more database instances in the first set of one or more database instances and a second sum of one or more respective weighted sums for the one or more database instances in the second set of one or more database instances, and executing the resharding operation that results in the first set of one or more database instances continuing to be supported by the first database server and the second set of one or more database instances being supported by the second database server.

An apparatus is described. The apparatus may include one or more memories storing processor executable code, and one or more processors coupled with the one or more memories. The one or more processors may individually or collectively operable to execute the code to cause the apparatus to identify a respective set of multiple workload metrics for each database instance of a set of multiple database instances supported by a first database server, generate, for each database instance, a respective weighted sum of the respective set of multiple workload metrics, select, for a resharding operation and from among the set of multiple database instances, a first set of one or more database instances to continue being supported by the first database server and a second set of one or more database instances to be supported by a second database server that is different from the first database server, where selection of the first set of one or more database instances and the second set of one or more database instances is based on a relationship between a first sum of one or more respective weighted sums for the one or more database instances in the first set of one or more database instances and a second sum of one or more respective weighted sums for the one or more database instances in the second set of one or more database instances, and execute the resharding operation that results in the first set of one or more database instances continuing to be supported by the first database server and the second set of one or more database instances being supported by the second database server.

Another apparatus is described. The apparatus may include means for identifying a respective set of multiple workload metrics for each database instance of a set of multiple database instances supported by a first database server, means for generating, for each database instance, a respective weighted sum of the respective set of multiple workload metrics, means for selecting, for a resharding operation and from among the set of multiple database instances, a first set of one or more database instances to continue being supported by the first database server and a second set of one or more database instances to be supported by a second database server that is different from the first database server, where selection of the first set of one or more database instances and the second set of one or more database instances is based on a relationship between a first sum of one or more respective weighted sums for the one or more database instances in the first set of one or more database instances and a second sum of one or more respective weighted sums for the one or more database instances in the second set of one or more database instances, and means for executing the resharding operation that results in the first set of one or more database instances continuing to be supported by the first database server and the second set of one or more database instances being supported by the second database server.

A non-transitory computer-readable medium storing code is described. The code may include instructions executable by one or more processors to identify a respective set of multiple workload metrics for each database instance of a set of multiple database instances supported by a first database server, generate, for each database instance, a respective weighted sum of the respective set of multiple workload metrics, select, for a resharding operation and from among the set of multiple database instances, a first set of one or more database instances to continue being supported by the first database server and a second set of one or more database instances to be supported by a second database server that is different from the first database server, where selection of the first set of one or more database instances and the second set of one or more database instances is based on a relationship between a first sum of one or more respective weighted sums for the one or more database instances in the first set of one or more database instances and a second sum of one or more respective weighted sums for the one or more database instances in the second set of one or more database instances, and execute the resharding operation that results in the first set of one or more database instances continuing to be supported by the first database server and the second set of one or more database instances being supported by the second database server.

In some examples of the method, apparatus, and non-transitory computer-readable medium described herein, selecting the first set of one or more database instances and the second set of one or more database instances may include operations, features, means, or instructions for selecting the first set of one or more database instances and the second set of one or more database instances such that a difference between the first sum and the second sum may be minimized.

In some examples of the method, apparatus, and non-transitory computer-readable medium described herein, generating the respective weighted sum includes for a database instance may include operations, features, means, or instructions for applying a first weighting factor to a quantity of writes metric that may be included in the respective set of multiple workload metrics for the database instance, applying a second weighting factor to a quantity of connections metric that may be included in the respective set of multiple workload metrics for the database instance, and applying a third weighting factor to a quantity of reads metric that may be included in the respective set of multiple workload metrics for the database instance.

In some examples of the method, apparatus, and non-transitory computer-readable medium described herein, the first weighting factor may be greater than the second weighting factor and the second weighting factor may be greater than the third weighting factor.

In some examples of the method, apparatus, and non-transitory computer-readable medium described herein, identifying the respective set of multiple workload metrics for each database instance may include operations, features, means, or instructions for identifying the respective set of multiple workload metrics in accordance with operations of the set of multiple database instances during a time window prior to execution of the resharding operation.

Some examples of the method, apparatus, and non-transitory computer-readable medium described herein may further include operations, features, means, or instructions for determining that a vertical scaling limit may be satisfied for the first database server, where the vertical scaling limit may be based on a quantity of resources associated with the first database server and triggering execution of the resharding operation based on the vertical scaling limit being satisfied.

Some examples of the method, apparatus, and non-transitory computer-readable medium described herein may further include operations, features, means, or instructions for determining that processor usage metric for the first database server may be over a processor usage threshold during a time window prior to the resharding operation and triggering execution of the resharding operation based on the processor usage metric being over the processor usage threshold.

Some examples of the method, apparatus, and non-transitory computer-readable medium described herein may further include operations, features, means, or instructions for selecting a respective weighting factor for each of the respective set of multiple workload metrics based on the first database server supporting data backup operations for one or more host computing environments.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   identifying a respective plurality of workload metrics for each database instance of a plurality of database instances supported by a first database server;
   generating, for each database instance, a respective weighted sum of the respective plurality of workload metrics;
   selecting, for a resharding operation and from among the plurality of database instances, a first set of one or more database instances to continue being supported by the first database server and a second set of one or more database instances to be supported by a second database server that is different from the first database server, wherein selection of the first set of one or more database instances and the second set of one or more database instances is based at least in part on a relationship between a first sum of one or more respective weighted sums for the one or more database instances in the first set of one or more database instances and a second sum of one or more respective weighted sums for the one or more database instances in the second set of one or more database instances; and executing the resharding operation that results in the first set of one or more database instances continuing to be supported by the first database server and the second set of one or more database instances being supported by the second database server.

2. The method of claim 1, wherein selecting the first set of one or more database instances and the second set of one or more database instances comprises:
selecting the first set of one or more database instances and the second set of one or more database instances such that a difference between the first sum and the second sum is minimized.

3. The method of claim 1, wherein generating the respective weighted sum comprises for a database instance comprises:
applying a first weighting factor to a quantity of writes metric that is included in the respective plurality of workload metrics for the database instance;
applying a second weighting factor to a quantity of connections metric that is included in the respective plurality of workload metrics for the database instance; and
applying a third weighting factor to a quantity of reads metric that is included in the respective plurality of workload metrics for the database instance.

4. The method of claim 3, wherein:
the first weighting factor is greater than the second weighting factor; and
the second weighting factor is greater than the third weighting factor.

5. The method of claim 1, wherein identifying the respective plurality of workload metrics for each database instance comprises:
identifying the respective plurality of workload metrics in accordance with operations of the plurality of database instances during a time window prior to execution of the resharding operation.

6. The method of claim 1, further comprising:
determining that a vertical scaling limit is satisfied for the first database server, wherein the vertical scaling limit is based at least in part on a quantity of resources associated with the first database server; and
triggering execution of the resharding operation based at least in part on the vertical scaling limit being satisfied.

7. The method of claim 1, further comprising:
determining that processor usage metric for the first database server is over a processor usage threshold during a time window prior to the resharding operation; and
triggering execution of the resharding operation based at least in part on the processor usage metric being over the processor usage threshold.

8. The method of claim 1, further comprising:
selecting a respective weighting factor for each of the respective plurality of workload metrics based at least in part on the first database server supporting data backup operations for one or more host computing environments.

9. The method of claim 1, further comprising:
comparing the first sum of the one or more respective weighted sums for the one or more database instances in the first set of one or more database instances with the second sum of the one or more respective weighted sums for the one or more database instances in the second set of one or more database instances, wherein selecting the first set of one or more database instances to continue being supported by the first database server and the second set of one or more database instances to be supported by the second database server that is different from the first database server is based at least in part on the comparing.

10. An apparatus, comprising:
one or more memories storing processor-executable code; and
one or more processors coupled with the one or more memories and individually or collectively operable to execute the code to cause the apparatus to:
identify a respective plurality of workload metrics for each database instance of a plurality of database instances supported by a first database server;
generate, for each database instance, a respective weighted sum of the respective plurality of workload metrics;
select, for a resharding operation and from among the plurality of database instances, a first set of one or more database instances to continue being supported by the first database server and a second set of one or more database instances to be supported by a second database server that is different from the first database server, wherein selection of the first set of one or more database instances and the second set of one or more database instances is based at least in part on a relationship between a first sum of one or more respective weighted sums for the one or more database instances in the first set of one or more database instances and a second sum of one or more respective weighted sums for the one or more database instances in the second set of one or more database instances; and
execute the resharding operation that results in the first set of one or more database instances continuing to be supported by the first database server and the second set of one or more database instances being supported by the second database server.

11. The apparatus of claim 10, wherein, to select the first set of one or more database instances and the second set of one or more database instances, the one or more processors are individually or collectively operable to execute the code to cause the apparatus to:
select the first set of one or more database instances and the second set of one or more database instances such that a difference between the first sum and the second sum is minimized.

12. The apparatus of claim 10, wherein, to generate the respective weighted sum comprises for a database instance, the one or more processors are individually or collectively operable to execute the code to cause the apparatus to:
apply a first weighting factor to a quantity of writes metric that is included in the respective plurality of workload metrics for the database instance;
apply a second weighting factor to a quantity of connections metric that is included in the respective plurality of workload metrics for the database instance; and
apply a third weighting factor to a quantity of reads metric that is included in the respective plurality of workload metrics for the database instance.

13. The apparatus of claim 12, wherein:
the first weighting factor is greater than the second weighting factor; and
the second weighting factor is greater than the third weighting factor.

14. The apparatus of claim 10, wherein, to identify the respective plurality of workload metrics for each database instance, the one or more processors are individually or collectively operable to execute the code to cause the apparatus to:

identify the respective plurality of workload metrics in accordance with operations of the plurality of database instances during a time window prior to execution of the resharding operation.

15. The apparatus of claim 10, wherein the one or more processors are individually or collectively further operable to execute the code to cause the apparatus to:

determine that a vertical scaling limit is satisfied for the first database server, wherein the vertical scaling limit is based at least in part on a quantity of resources associated with the first database server; and trigger execution of the resharding operation based at least in part on the vertical scaling limit being satisfied.

16. The apparatus of claim 10, wherein the one or more processors are individually or collectively operable to execute the code to cause the apparatus to:

compare the first sum of the one or more respective weighted sums for the one or more database instances in the first set of one or more database instances with the second sum of the one or more respective weighted sums for the one or more database instances in the second set of one or more database instances, wherein selection of the first set of one or more database instances to continue being supported by the first database server and the second set of one or more database instances to be supported by the second database server that is different from the first database server is based at least in part on the comparing.

17. A non-transitory computer-readable medium storing code, the code comprising instructions executable by one or more processors to:

identify a respective plurality of workload metrics for each database instance of a plurality of database instances supported by a first database server;

generate, for each database instance, a respective weighted sum of the respective plurality of workload metrics;

select, for a resharding operation and from among the plurality of database instances, a first set of one or more database instances to continue being supported by the first database server and a second set of one or more database instances to be supported by a second database server that is different from the first database server, wherein selection of the first set of one or more database instances and the second set of one or more database instances is based at least in part on a relationship between a first sum of one or more respective weighted sums for the one or more database instances in the first set of one or more database instances and a second sum of one or more respective weighted sums for the one or more database instances in the second set of one or more database instances; and execute the resharding operation that results in the first set of one or more database instances continuing to be supported by the first database server and the second set of one or more database instances being supported by the second database server.

18. The non-transitory computer-readable medium of claim 17, wherein, to select the first set of one or more database instances and the second set of one or more database instances, the instructions are executable by the one or more processors to:

select the first set of one or more database instances and the second set of one or more database instances such that a difference between the first sum and the second sum is minimized.

19. The non-transitory computer-readable medium of claim 17, wherein, to generate the respective weighted sum comprises for a database instance, the instructions are executable by the one or more processors to:

apply a first weighting factor to a quantity of writes metric that is included in the respective plurality of workload metrics for the database instance;

apply a second weighting factor to a quantity of connections metric that is included in the respective plurality of workload metrics for the database instance; and apply a third weighting factor to a quantity of reads metric that is included in the respective plurality of workload metrics for the database instance.

20. The non-transitory computer-readable medium of claim 17, wherein the instructions are further executable by the one or more processors to:

compare the first sum of the one or more respective weighted sums for the one or more database instances in the first set of one or more database instances with the second sum of the one or more respective weighted sums for the one or more database instances in the second set of one or more database instances, wherein selection of the first set of one or more database instances to continue being supported by the first database server and the second set of one or more database instances to be supported by the second database server that is different from the first database server is based at least in part on the comparing.

* * * * *